May 7, 1929.　　　　F. G. HUGHES　　　　1,712,076

SEPARATOR AND METHOD THEREFOR

Filed Feb. 19, 1927

INVENTOR:
FREDERICK G. HUGHES,
BY
HIS ATTORNEY.

Patented May 7, 1929.

1,712,076

UNITED STATES PATENT OFFICE.

FREDERICK G. HUGHES, OF BRISTOL, CONNECTICUT, ASSIGNOR TO THE NEW DEPARTURE MANUFACTURING COMPANY, OF BRISTOL, CONNECTICUT, A CORPORATION OF CONNECTICUT.

SEPARATOR AND METHOD THEREFOR.

Application filed February 19, 1927. Serial No. 169,663.

This invention relates to separators for antifriction bearings and comprises all the features of novelty herein disclosed, for example, by reference to a cage or separator for ball bearings with the process of making it.

In common forms of antifriction bearings having a pair of opposed raceways with interposed rolling elements, such as cylindrical, spherical, or other forms of rollers, the cage is very often the least satisfactory portion of the bearing and the part that is most likely to induce ultimate failure. A successful separator must be accurately shaped and light to be easily driven, it must be strong to resist the pushing and stresses due to loaded rollers, it should operate with little friction and be inexpensive, and especially should it be durable. Some of these qualities are difficult to obtain, especially with others. For instance, hardness negatives ductility and vice-versa, and the lack of satisfactory space may sacrifice strength. Separators require a comparatively soft metal if they are to be easily and accurately stamped or pressed into shape but, in use, contact of the rolling elements with the softer separator metal develops looseness which increases the friction, weakens the cage, and produces heat and noise. Gritty particles easily get imbedded in the metal of the pockets and scratch and mar the polished surfaces of the rolling elements resulting in increased friction, wear and lessened efficiency generally, and corrosion indirectly produces similar results. Hardening the separator before forming is precluded by the difficulty of shaping hard and brittle material, and puts strains in the drawn metal; hardening after forming causes distortion in heat treatment and so impairs the shape, necessitating grinding or other expensive, corrective treatment.

An object of the invention, therefore, is to provide a separator which is light, strong and properly shaped, yet inexpensive and durable, and one that will avoid the above noted and other defects of prior devices. Another object is to provide an improved process of making separators. To these ends and to improve generally upon devices and processes of the character indicated, the invention also consists in the various matters hereinafter described and claimed. These objects are in part realized by making the separator out of comparatively soft and ductile steel which is readily pressed into accurate form with little strain, and then placing a thin coating of very hard non-corrosive metal on the sides of the roller pockets, the metal being harder than the rollers to avoid the penetration of gritty particles and to form a smooth, polished lining to decrease friction and subsequent wear. In some cases the lining may be applied before shaping the metal because it is thin enough to bend into some shapes with its metal backing. Metallic chromium applied by electrolysis is a preferred lining as it does not distort the separator or make it brittle, is non-corrosive, is very hard, and has a natural polish which lessens friction.

The invention, in its broader aspects, is not necessarily limited to the particular disclosure selective for illustrative purposes in the accompanying drawings in which:—

Figure 1:
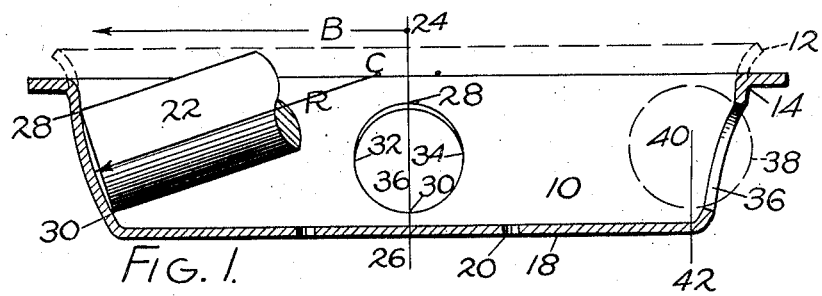
Figure 1 is a sectional view of an unfinished ball separator indicating several steps in its manufacture.

The numeral 10 indicates a cup-shaped body pressed or drawn into shape as by dies from a disc of ductile steel. The rim 12 is outwardly bent as at 14 and subsequently trimmed off to form a radial flange 16. The bottom 18 of the cup body 10 conveniently has dog holes 20 punched therein to engage locating pins in a holder (not shown) which subsequently rotates the separator body to present it to a radially reciprocating punch 22 for successively forming ball openings.

The body has a mean radius B around an axis 24—26 and a transverse radius of curvature R which is a little less than B with its center at C near one side of the body. This produces a ring of metal which is concavo-convex and flaring and the surface is not that of a segment of a sphere (as it would be if C were in the axis 24—26) but a surface approximating a spherical segment. Hence a cylindrical punch 22, reciprocated normal to the surface, would cut first at points 28 and 30 and later at points 32 and 34 in the median line of the ring. A ball (of larger diameter than the punch) placed in an opening 36 thus cut in the ring would bear at only two points 28 and 30 and have a clearance at 32 and 34 and everywhere else, the opening being in its effect on the ball, like an elliptical opening in a flat plate, the minor axis extending crosswise of the ring. The ball 38 shown in dash lines at the right of Figure 1 would have its center of gravity in a line 40—42 inside one edge of the ball opening. Hence in assembling the balls in the openings, preparatory to inserting an inner race ring between them, there would be no tendency for the balls to drop into the openings and stay there by gravity but they would tend to fall towards the center.

Figure 3:
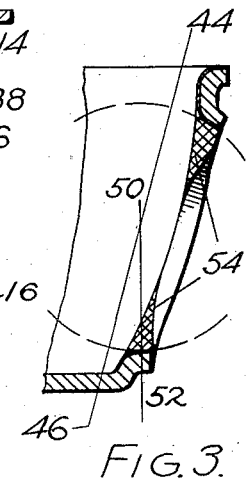
Figure 3 is an enlarged sectional view of a ball pocket.
Figure 7:
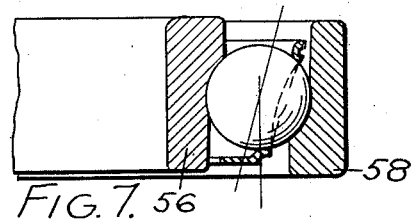
Figure 7 is a section of a completed ball bearing having a separator like that of Figure 2.

To increase the facility of loading the separator with balls and holding them in the openings, also to bring the points of contact of each ball with the separator nearer to the natural poles or axis of rotation 44—46 in an assembled bearing, and to increase the area of contact near the poles, the metal is extruded as indicated at 48 in the region of the points 28, 30. This enables the ball to penetrate further into its opening so that its center of gravity lies in a line 50—52 the better to find and hold its position by gravity when the separator is horizontal. It projects through its opening but not far enough to escape outwardly of the separator. The balls are thus guided entirely by a contact area outside of a great circle through their axes of rotation 44—46 to have the advantages of outside separator control. The metal is pressed outwardly preferably by forcing, against the edge of the opening, a ball of a radius slightly larger than the radius of a ball used in the completed bearing. Hence the guiding surface is a segment of a sphere of slightly larger radius than the ball to avoid wedging contact. The pressing out of the metal may be extensive enough to give the balls contact all around the rims of the openings but is preferably less extensive in order to have more nearly polar contact and a clearance in the region of the points 32 and 34 where the ball hole punching operation may leave sharp and jagged edges. There is thus an area of contact of the balls with the sides of the pockets and, as indicated in Figure 3, this area has a lining 54 of very hard metal, preferably metallic chromium applied by electrolytic deposition. This coating reduces the radius of the spherical segments on the pockets more nearly to the ball radius but not smaller. The coating may sometimes be applied before forming the surfaces 48 and to any convenient area of the body as it does not distort the body and is thin enough to bend with the backing metal. The bottom 18 of the body is punched out at any convenient stage after punching the ball openings leaving a second radial stiffening flange 52. The separator and balls are shown in Figure 7 assembled with inner and outer race rings 56 and 58.

Figure 2:
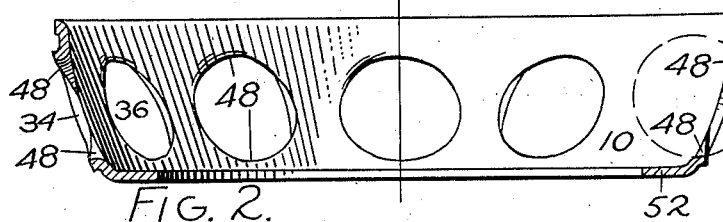
Figure 2 is a similar view of the finished separator.
Figure 4:
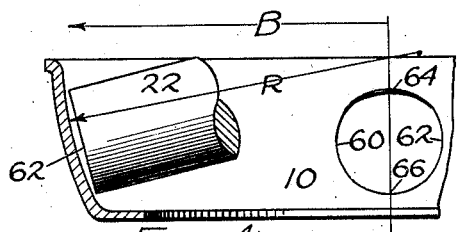
Figure 4 is a sectional view of a modified form of separator in an unfinished state.
Figure 6:
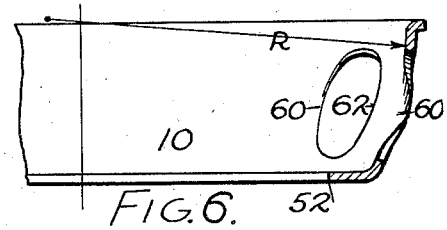
Figure 6 is a sectional view showing a portion of the separator completed.
Figure 5:
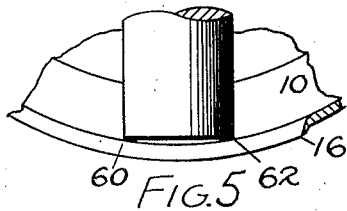
Figure 5 is a front view of parts shown in Figure 4.
Figures 8, 9:
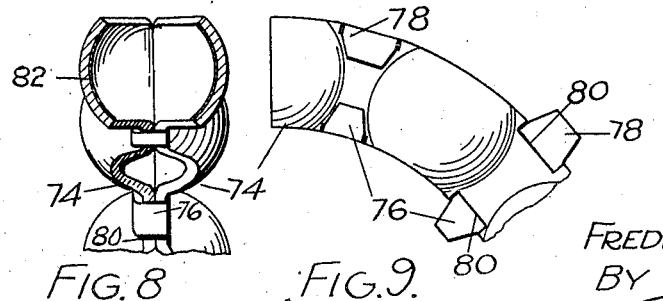
Figure 8 is a sectional view of another form of separator.
Figure 9 is a partial side view of the separator of Figure 8.

In Figures 4, 5 and 6, the separator construction is similar but the transverse radius R is greater than the mean radius B of the body of the ring. This also produces a surface departing somewhat from that of a sphere, such that a cylindrical punch 22 would begin to punch first at points 60 and 62 in the middle of the ring and later punch at points 64 and 66. A ball inserted in such an opening would bear only at points 60 and 62 and have a clearance at 64 and 66 and everywhere else. The penetration of the ball through the ring may be increased by pressing out the metal at the front and rear of the opening in the region of the points 60 and 62 as indicated in Figure 6. This form has one advantage over that of Figure 2 in that the metal is not pressed outwardly from the weaker edges of the ring but from the stiffer middle portion. The ball pockets are lined or coated as before. Figures 8 and 9 show another form of separator comprising a ring composed of stamped out wavy sections 74 united by inner and outer flaps 76 and 78 integral with one of the sections and bent over and filling notches 80 in the other section. The pockets are lined with a hard coating 82 of metallic chromium or the like conforming in curvature to the balls.

I claim:

1. The method of making a separator which consists in die forming comparatively soft and ductile metal into the form of a ring having pockets for rolling elements, and lining said pockets, after forming the ring, with a layer of hard, non-corrosive metal to engage the rolling elements, the metal being deposited by electrolysis to avoid distortion of the formed separator; substantially as described.

2. The method of making a separator which consists in die forming comparatively soft and ductile steel into the form of a ring having pockets for rolling elements, forming the sides of the pockets to give them a larger radius of curvature than that of the rolling elements, and reducing the radius of curvature of said pockets substantially to that of the rolling elements by lining them with a layer of metal; substantially as described.

3. The method of making a ball separator which consists in forming a flaring ring concavo-convex in cross section with the cross sectional radius of curvature different from the radius of the ring, thereby producing a near-spherical surface, reciprocating a cylindrical tool normal to said surface to shear out openings capable of contacting at only two points with a ball, and increasing the contact to an area by pressing the metal outwardly in the region of said points; substantially as described.

4. In a separator for antifriction bearings, a separator body having a circular series of pockets to receive rolling elements, the sides of the pockets conforming to the adjacent surfaces of the rolling elements, and a lining of hard non-corrosive metal deposited on the sides of the pockets; substantially as described.

5. The method of making a separator which consists in forming a cup with a flaring body wall, bending the rim of the cup outwardly to form an edge stiffening flange, punching a series of openings in the flaring body wall of the cup for the rolling elements, and cutting out the central portion of the bottom of the cup to leave an inwardly extending stiffening flange; substantially as described.

6. The method of making a separator which consists in forming a cup with a flaring body wall, bending the rim of the cup outwardly to form an edge stiffening flange, utilizing the bottom wall of the cup to rotate it with respect to a punch, punching a series of openings in the flaring body wall of the cup for rolling elements, and cutting out the central portion of the bottom wall of the cup to leave an inwardly extending stiffening flange; substantially as described.

7. The method of making a separator which consists in forming a cup with a flaring body wall, punching holes in the bottom wall of the cup, utilizing the bottom wall and the holes to rotate the cup with respect to a punch, punching a series of openings in the flaring body wall to receive rolling elements, and cutting out the portion of the bottom wall having the holes; substantially as described.

8. The method of making a separator which consists in forming a cup with a flaring body wall, utilizing the bottom wall of the cup to rotate it with respect to a punch, and reciprocating the punch normal to the flaring body wall to cut a series of openings for rolling elements; substantially as described.

In testimony whereof I hereunto affix my signature.

FREDERICK G. HUGHES.